United States Patent
Johnson

(12) United States Patent (10) Patent No.: US 7,279,022 B2
Johnson (45) Date of Patent: Oct. 9, 2007

(54) SPIRALTRAP: DEVICES AND METHODS FOR THE TRAPPING PARTICULATE MATTER IN EXHAUST AND OF OTHER POLLUTANTS

(75) Inventor: Richard C. Johnson, Poquott, NY (US)

(73) Assignee: Industrial Widget Works Company, Poquott, NY (US)

( * ) Notice: Subject to any disclaimer, the term of this patent is extended or adjusted under 35 U.S.C. 154(b) by 0 days.

(21) Appl. No.: 11/340,014

(22) Filed: Jan. 24, 2006

(65) Prior Publication Data

US 2006/0191415 A1 Aug. 31, 2006

Related U.S. Application Data

(60) Provisional application No. 60/646,688, filed on Jan. 24, 2005.

(51) Int. Cl.
*B01D 45/12* (2006.01)
*B01D 46/24* (2006.01)

(52) U.S. Cl. .................. 55/399; 55/520; 55/523; 55/DIG. 30

(58) Field of Classification Search ............ 55/399, 55/456, 457, 520, 523, 385.3, DIG. 30
See application file for complete search history.

(56) References Cited

U.S. PATENT DOCUMENTS

| | | | | |
|---|---|---|---|---|
| 1,421,432 A * | 7/1922 | Embanks | .................. | 261/124 |
| 3,129,078 A * | 4/1964 | Hobbs | .................. | 55/313 |
| 3,633,343 A * | 1/1972 | Mark | .................. | 96/118 |
| 3,813,854 A * | 6/1974 | Hortman | .................. | 55/399 |
| 3,853,512 A * | 12/1974 | Hayashi | .................. | 96/59 |
| 3,966,443 A * | 6/1976 | Okano et al. | .................. | 55/337 |
| 4,730,454 A * | 3/1988 | Pischinger et al. | .................. | 60/274 |
| 5,857,326 A * | 1/1999 | Blanchet | .................. | 60/297 |
| 6,589,322 B2 * | 7/2003 | D'Eletto | .................. | 96/189 |

* cited by examiner

*Primary Examiner*—Frank M. Lawrence
(74) *Attorney, Agent, or Firm*—Young Law Firm, P.C.

(57) ABSTRACT

Embodiments of the present invention include methods and devices for trapping particulate matter suspended in exhaust from, for example, automotive diesel engines. Particulates carried in exhaust are actually a colloidal suspension of finely divided particulates in a fluid (in this case, the exhaust gases). This colloidal mixture is channeled through an open spiral exhaust channel. The particulates will differentially tend to travel through the fluid in a straight line, which leads them to collide with a fine mesh or porous material that defines the open spiral exhaust channel. The gas, on the other hand, will easily traverse the spirally shaped exhaust channel, with its molecules bouncing around the curved path of the spiral. Continuing through the device, more and more particulates will build up in the surrounding meshwork or porous material.

18 Claims, 5 Drawing Sheets

US 7,279,022 B2

SPIRALTRAP: DEVICES AND METHODS FOR THE TRAPPING PARTICULATE MATTER IN EXHAUST AND OF OTHER POLLUTANTS

This application claims the benefit under 35 U.S.C. § 119(e), of U.S. provisional application Ser. No. 60/646,688, filed Jan. 24, 2005, which application is hereby incorporated herein by reference in its entirety.

BACKGROUND OF THE INVENTION

1. Field of the Invention

The present inventions relate to pollution reducing devices and methods. In particular, the present invention relates to the field of methods and devices for trapping particulate matter suspended in exhaust from, for example, an automotive diesel engine.

2. Description of the Related Art

Diesel engines provide very efficient power from a given amount of fuel, and they are able to use significantly less expensive fuels than gasoline engines. Thus, for trucks, buses, railroad locomotives, generators, and even automobiles, the diesel engine is preferred over the gasoline engine. The major drawback to diesel powered vehicles is the exhaust pollution, which is quite different than generated from a gasoline engine. The diesel engine has fuel injected into the cylinder at a point when air in the cylinder has reached a high degree of compression.

Highly compressed air reaches temperatures above the ignition point of diesel fuel, so the fuel sprayed via injector into the cylinder spontaneously ignites at the temperature of the compressed air and, by dint of the hot burning gases generated, the piston is impelled down the cylinder and power is provided to gear, wheel, and propeller. The problem is that the temperature is not uniform throughout the cylinder and some small portions of the fuel will not burn but rather be subject to reduction (carbon-hydrogen bond broken and carbon-carbon bond formed) as well as combustion (carbon-hydrogen bond broken and carbon-oxygen and hydrogen-oxygen bonds formed).

The exhaust eventually expelled from the cylinder (as a four-stroke engine), the next compression stroke will push gases out of the cylinder and into the manifold which first receives the exhaust. The exhaust gases (mostly oxides of carbon, hydrogen, and nitrogen) carry these small particles (called particulates) with them. If these particulates leave the tailpipe of the car or the stack of the truck, boat, train, or bus, they are released into the air around the road, waterway, street, and railroad. In cities, a fine black dust settles over the area (very common in some cities) and the air itself carries the particulate to people who breathe this dust. It is not only filthy, but it has also been shown in some studies to cause cancer and to aggravate some conditions, such as asthma.

Government environmental regulations have focused on the need to remove particulates from diesel exhaust and thus the environment. Three approaches have been used: (1) modify the fuel to engender more complete combustion, (2) modify the engine to make combustion more complete, and (3) modify the exhaust system to remove, trap, and/or (once the particulates have left the cylinder where they originated) further subject them to high temperature and/or catalytic combustion. The options above (1) and (2) are expensive; (1) will affect all diesel engines for which the modified fuel is used and (2) will affect only the new engines which incorporate this technology. What are needed, therefore are novel solutions that address option (3) above; that is, to focus on the exhaust system for the solution to the particulate pollution problem.

SUMMARY OF THE INVENTION

Figure 1:
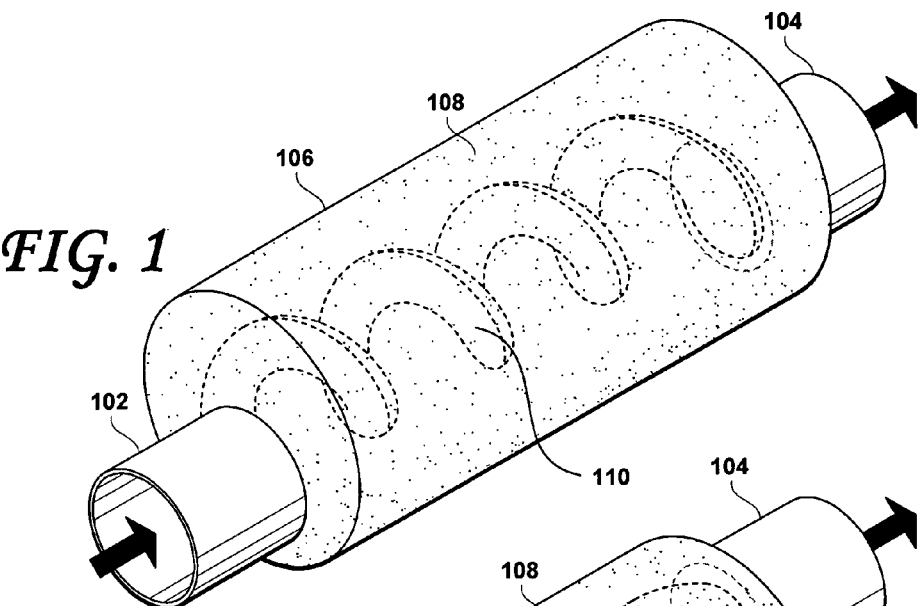
FIG. 1 shows an example of the present device for reducing the amount of particulates emitted in exhaust, according to an embodiment of the present invention.

According to an embodiment thereof, the present invention is a pollution reducing device, comprising a tube defining a an internal lumen, a first free end and a second free end; a layer of particulate absorbing material disposed within the internal lumen, the particulate absorbing material defining a helically-shaped void that extends from the first free end to the second free end.

According to further embodiments, an exhaust inlet may be coupled to the first free end and an exhaust outlet may be coupled to the second free end. The layer of particulate absorbing material may define a porosity density and the porosity density may be constant from the first free end to the second free end. Alternatively the porosity density may be different near the first free end than it is be near the second free end. For example, the porosity density may increase from the first free end to the second free end. The porosity density may alternatively decrease from the first free end to the second free end. The tube may define a longitudinal axis, the layer of particulate absorbing material may define a porosity density and the porosity density may be different closer to the longitudinal axis than it may be away from the longitudinal axis. The porosity density may be greater closer to the longitudinal axis than it may be away from the longitudinal axis. The porosity density may be lesser closer to the longitudinal axis than it may be away from the longitudinal axis. The particulate absorbing material may include a ceramic, such as ceramic foam, for example. Alternatively, the particulate absorbing material may define a (selectively loose or tight) meshwork.

According to another embodiment thereof, the present invention is also a method of reducing particulate pollution from a source of particulate-containing exhaust. The method may include steps of providing a pollution reducing device, the pollution reducing device including a tube defining an internal lumen, a first free end and a second free end, and a layer of particulate absorbing material disposed within the internal lumen, the particulate absorbing material defining a helically-shaped void that extends from the first free end to the second free end; coupling the pollution reducing device to the source of exhaust, and trapping particulates from the exhaust within the particulate absorbing material.

The providing step may be carried out with the pollution reducing device further comprising an exhaust inlet coupled to the first free end and an exhaust outlet coupled to the second free end. The providing step may be carried out with the layer of particulate absorbing material defining a porosity density and the porosity density may be constant from the first free end to the second free end. Alternatively, the porosity density may be different near the first free end than it may be near the second free end. For example, the porosity density may increase from the first free end to the second free end. Alternatively, the porosity density may decrease from the first free end to the second free end. The providing step may be carried out with the tube defining a longitudinal axis and with the layer of particulate absorbing material defining a porosity density. The porosity density may be different closer to the longitudinal axis than it may be away from the longitudinal axis. For example, the providing step may be carried out with the porosity density being greater closer to the longitudinal axis than it may be away from the longitudinal axis. Alternatively, the providing step may be carried out with the porosity density being lesser closer to the longitudinal axis than it may be away from the longitudinal axis. The providing step may be carried out with the particulate absorbing material including a ceramic, such as a ceramic foam, for example. The providing step may be carried out with the particulate absorbing material defining a (selectively tight or loose) meshwork.

DESCRIPTION OF THE PREFERRED EMBODIMENTS

Figure 2:
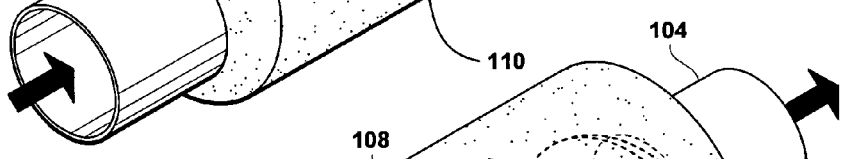
FIG. 2 shows another example of the present device for reducing the amount of particulates emitted in exhaust, according to another embodiment of the present invention.
Figure 3:
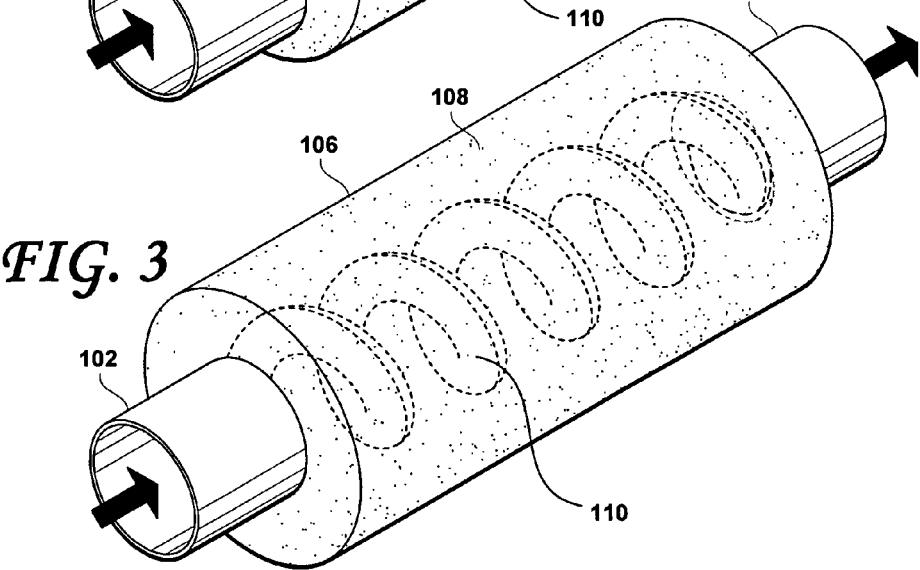
FIG. 3 shows another example of the present device for reducing the amount of particulates emitted in exhaust, according to another embodiment of the present invention.

FIGS. 1-3 show different embodiments of the present invention. An embodiments of the present invention is a mechanical device with no moving parts which will channel diesel or other exhaust gases containing particulates through a (e.g., metal) tube 106 having an internal lumen that is lined with absorbing material 108 (such as a ceramic foam, for example). The absorbing material 108 lined within the lumen 110 of the tube 106 may define a void having a spiral or extended coil shape that extends from one free end of the tube (e.g., the exhaust inlet 102) to the other free end of the tube (e.g., the exhaust outlet 104). In this manner, exhaust may travel from the inlet 102 to the outlet 104 while being constrained to follow the spiral shape of the void defined by the lining of the tube. The effect of the spiral will cause the particulates suspended in the exhaust, which particulates, having more momentum than the gases, continue in a straight line, to collide with and become trapped in the porous lining material on the walls of the spiral instead of proceeding out to the exhaust outlet 104 to pollute the air. The absorbing material 108 may be replaced at the end of its useful life or may be periodically serviced to burn off the accumulated trapped carbon particulates and replaced within the tube.

The simplicity of the embodiments of the present invention described and shown herein lays in its effective use of the physics of mixed materials, where one material is either gaseous or fluid, and the other material is composed of relatively small particulates, droplets of liquid, or very heavy gaseous molecules suspended therein. The problem, for engines such as diesels emitting gaseous exhaust containing particulate solids, is that most attempts at filtering will impede the gases and result in potentially performance degrading backpressure. The backpressure will hinder the function and lower the efficiency of the engine. Embodiments of the present invention address this problem by judicious choice of the shape of the spiral main channel through the liner material within the tube 106. This "spiral trap" causes particulates to collide with the sides of the helical main exhaust channel 110 (a spirally-shaped void) formed and defined by the porous lining material 108 within the tube 106. This shape forces the particulates suspended in the exhaust into proximity with (fine mesh strands of, for example) the porous or absorbing liner material 108 where they are effectively trapped. When used in automotive applications, the device may be fitted to the existing exhaust system, between the exhaust manifold and the tailpipe for example.

The composition of the liner material 108 within the tube 106 is such that it resists the high temperature of the exhaust gases and the exhaust system in general. According to an embodiment of the present invention, the liner material 108 within the tube that defines the spiral or helical exhaust channel may be formed of or may include one or more ceramic materials, since such materials are readily shaped and cured into a desired shape.

Figure 4A:
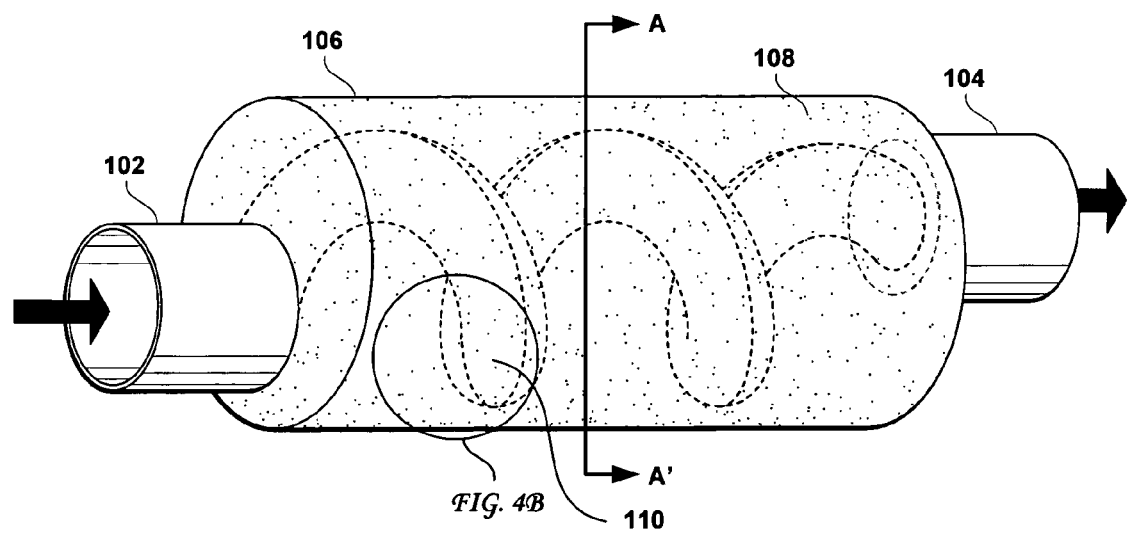
FIG. 4A shows the device of FIG. 2, to illustrate a detail thereof.
Figure 4B:
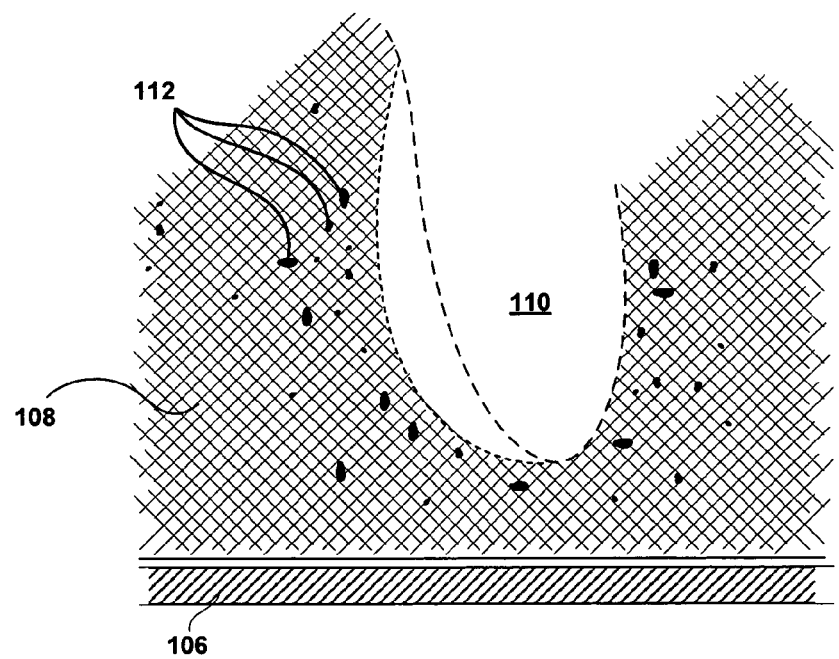
FIG. 4B shows a cross-sectional view of a portion of the device of FIG. 4A, showing the meshwork of the sleeve and exhaust particulates trapped therein.

According to an embodiment thereof, the present invention includes a tube 106 and a liner of mesh or porous material 108 inserted into the tube 106. Means for attaching the liner to the tube may also be included, or the liner material 108 may be coupled to the tube 106 by means of an interference fit. Alternatively, the liner 108 and the tube 106 may be combined to form a unitary assembly or a one-piece assembly, which may be disposable or recyclable and reusable. The tube 106 may be or may include stainless steel (for example) and may be straight (e.g., a right cylinder). Alternative construction materials, alternative means of casting or manufacturing the liner may be employed, as long as the liner 108 defines a largely open main exhaust channel 110, and is configured so as to trap particulates within the exhaust gases passing therethrough. For example, as shown in FIGS. 4A and 4B, the liner 108 may be formed of an array of intertwining strands of ceramic or other material, such that the intertwining meshwork will tend to trap the particulates 112 suspended in the exhaust gases as these gases pass through the exhaust channel 110. The main exhaust channel 110, required for the low backpressure of exhaust gases, may advantageously be shaped so as to define a coil, spiral, or helical exhaust channel 110, such that particulates carried by the gas moving through the exhaust system will tend to collide with the liner material 108 and become embedded therein. Gradually, the liner 108 will become more and more laden with the trapped particulates 112, while the gases may easily escape without losing much pressure along the open exhaust channel 110.

The liner 108 may be periodically replaced with either a new or a recycled liner. The liners 108 may be either flexible or rigid; in either case, they must be manufactured of materials that will at least tolerate the heating of the exhaust system and preferably also the high temperature of the recycling process. The simplest and most cost effective recycling process is believed to be collecting the particle-filled liners and subjecting them in batch to a flow of air at temperatures such that the (e.g., carbon) particulates 112 trapped therein would be burned off the liner material 108. The liner 108, now free of particulates, may then be reused by re-inserting the clean liner 108 into the tube 106 and the assembly re-fitted to source of exhaust gases (e.g, the exhaust system of an automobile). Embodiments of the present invention, therefore, having no moving parts, are relatively easy to manufacture, require no inherently expensive materials, and may be produced relatively inexpensively. Recycling costs, moreover, are believed to be minimal and should be acceptable to both users and manufacturers alike.

As an alternative embodiment, the tube 106 may itself be shaped as a spiral. In that case, the liner 108 may be configured to be sufficiently flexible as to conform to the spiral shape of the tube 106. Alternatively still, the liner 108 may be rigid or partially rigid and may be configured and shaped so as fit and screw into the tube 106.

The construction of a flexible liner 108 may be done by means of spraying the liner material in a plastic (moveable, semi fluid) state against the insides of the spiral shaped (e.g., metal) tube 106. The flexible liner 108 may also be configured with rigid pieces that move as a chain link armor, only with very small links. The formation of a rigid liner 108 such that it could screw into the spiral tube 106 is another alternative. Other modifications are possible, as those of skill in this art may appreciate, and all such modifications are deemed to fall within the scope of the present invention.

Figure 12:
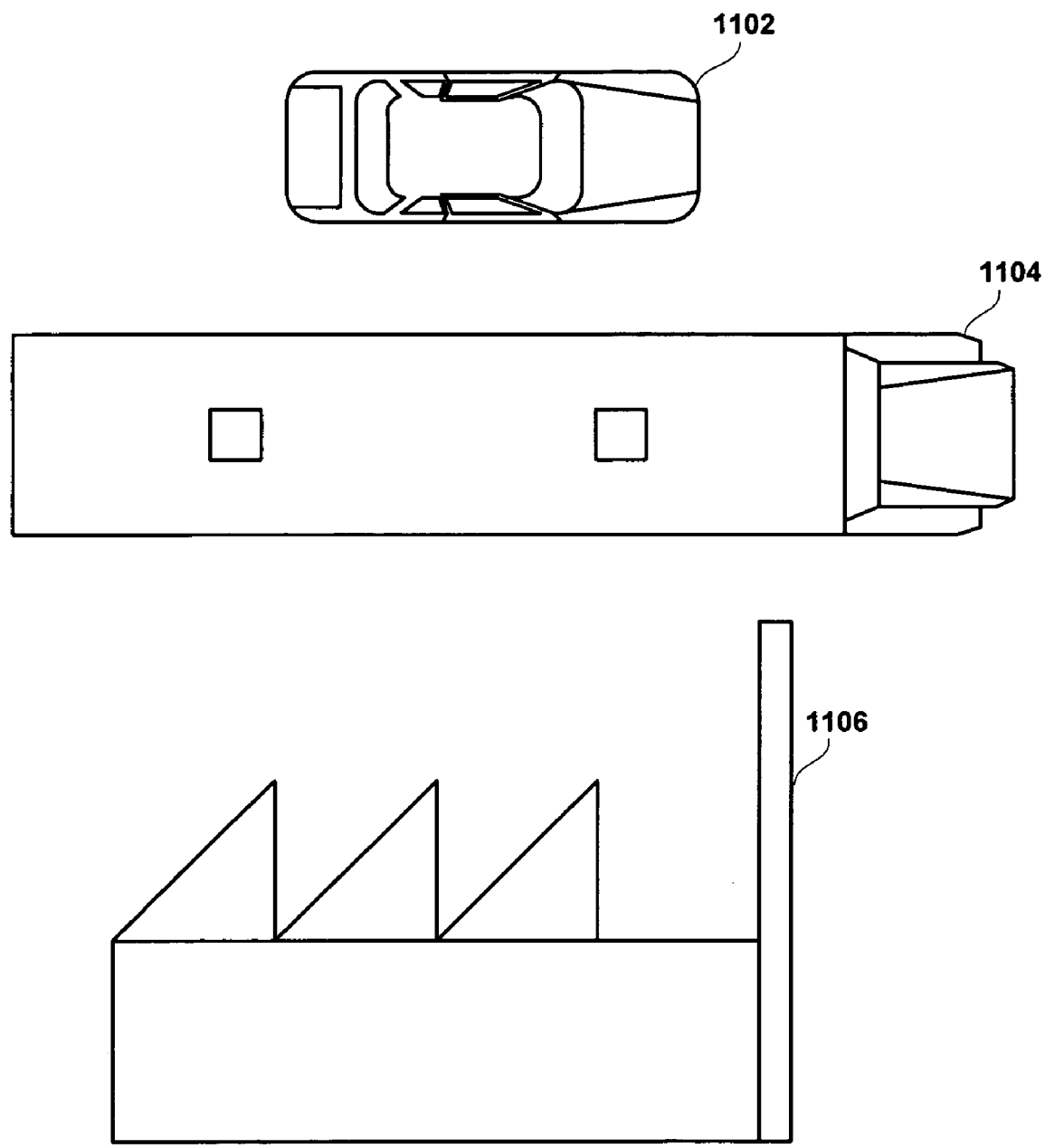
FIG. 12 shows a number of applications (e.g., vehicles and smokestacks) to which embodiments of the present invention may be fitted, to reduce the amount of particulates emitted by such devices, according to an embodiment of the present invention.

FIG. 12 shows a number of exemplary vehicles and applications in which embodiments of the present invention may be used to great advantage. For example, embodiments of the present invention may be fitted to automobiles 1102, while other embodiments may be configured to fit on mass transit buses and/or other trucks such as shown at 1104. Any coal fired device may also be fitted with an embodiment of the present invention. Embodiments of the present invention, however, are not limited to (e.g., diesel) automotive applications. For example, embodiments of the present invention may also be used to great advantage for particulate reduction from smokestacks such as shown at 1106 in FIG. 12 and other exhaust from industrial processes using combustion, dust reduction from coal processing plants, grain elevators, or other situations where excessive dust is a problem either in a confined area or in the introduction of the particulates into the environment, and/or trapping small particulates carried by water or any other fluid.

One central characteristic of embodiments of the present invention includes the use of a low back pressure exhaust channel 110 to cause exhaust gases to move in a manner that differentially affects suspended particulates 112 and the molecules of the gas. Indeed, exhaust is a mixture of solids (the particulates 112) and gases, which will behave very differently under the conditions induced therein as they flow through embodiments of the present invention. Conventional means for reducing particulates in exhaust gases rely on turbulent flow rather than the spirally directed flow through the present exhaust channel. According to embodiments of the present invention, as the exhaust is forced to flow through the spiral-shaped exhaust channel 110, the gas molecules are able to change direction more easily than the relatively heavier particulates 112 within the exhaust. Therefore, the gas molecules tend to be forced by the liner wall to follow the curvature of the liner whereas the suspended particulates 112 will tend to impact, and become lodged in the material of the liner 108. In this manner, this tendency differentially causes the particulates 112 being carried by the exhaust to collide with the increasingly dense mesh of the fiberglass/ceramic spun liner material 108 and thus become trapped. It is expected that a significant portion of the particulates 112 carried within the exhaust will, therefore, collide with and become enmeshed within the sides of the liner 108. When the liner 108 becomes saturated with particulates 112, the liner 112 and/or the assembly may be replaced with a new or recycled and clean liner 112.

Embodiments of the present invention take advantage of the fact that the particulates 112 have much more mass and, even at slower velocity, more momentum than the much smaller and lighter gas molecules. The particulates 112 and gas molecules will each tend to maintain their direction in a straight line unless acted on by a force (collision of gas with particulates and other molecules of gas) or the sides of their containing space (the wall of the liner). Unlike conventional devices having a cyclonic chamber, embodiments of the present invention include a linear extension of a spiral or helical liner channel 110 within a tube 106. According to other embodiments, it is possible to shape the tube 106 itself in a spiral or helical shape and the liner could be made to conform to that shape. The particulate trapping action, in either case, comes from the collision of particulates 112 with the liner material 108. Gas molecules will not stick to and will not become trapped within the liner. In contrast, particulates 112 will act as micro-asteroids and will collide with the spun fibers, meshwork or otherwise porous or particulate trapping structure of the liner 108 and will become lodged and stick therein. The different behavior under the induced conditions of exhaust flow enables embodiments of the present invention to effectively reduce the amount of suspended particulates within the exhaust gas as it exits the exhaust channel using a device having no moving parts.

Thus, embodiments of the present invention may be recycled, for example, by subjecting the unit to sufficiently high temperatures so as to burn off the trapped particulates 112 and/or convert them to $CO_2$ gas. Alternatively, the liner portion and/or the liner-tube assembly may be replaced when the liner becomes full of exhaust particulates. The disadvantage of the required periodic maintenance is offset by the simple and economical nature of the present device and exhaust particulate trapping methods described herein.

Figure 5:
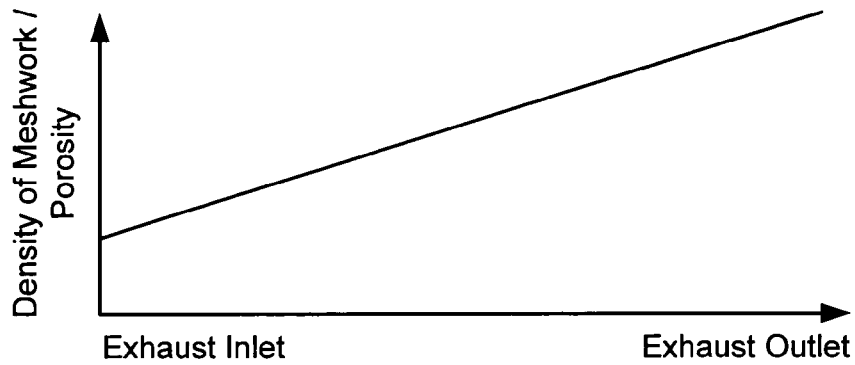
FIG. 5 shows an exemplary meshwork or porosity density distribution from the exhaust inlet of the device to the exhaust outlet of the device, according to an embodiment of the present invention.
Figure 6:
FIG. 6 shows another exemplary meshwork or porosity density distribution from the exhaust inlet of the device to the exhaust outlet of the device, according to an embodiment of the present invention.
Figure 7:
FIG. 7 shows still another exemplary meshwork or porosity density distribution from the exhaust inlet of the device to the exhaust outlet of the device, according to an embodiment of the present invention.

FIGS. 5-7 show exemplary meshwork or porosity density distributions from adjacent the exhaust inlet 102 to the exhaust outlet 104 of the present device, according to embodiments of the present invention. As shown, the density of the meshwork or porosity of the liner material 108 may increase, remain constant or decrease from near the exhaust inlet 102 to near the exhaust outlet 104, depending upon the desired performance, the material used for the liner 108 and the manufacturing processes used.

Figure 8:
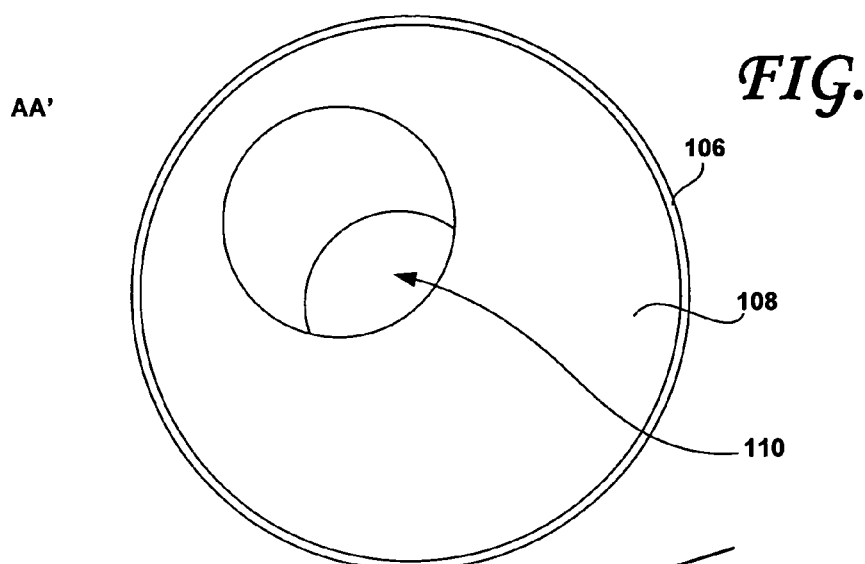
FIG. 8 is a cross-sectional view of the device of FIG. 4A, taken along cross-sectional lines AA'.
Figure 9:
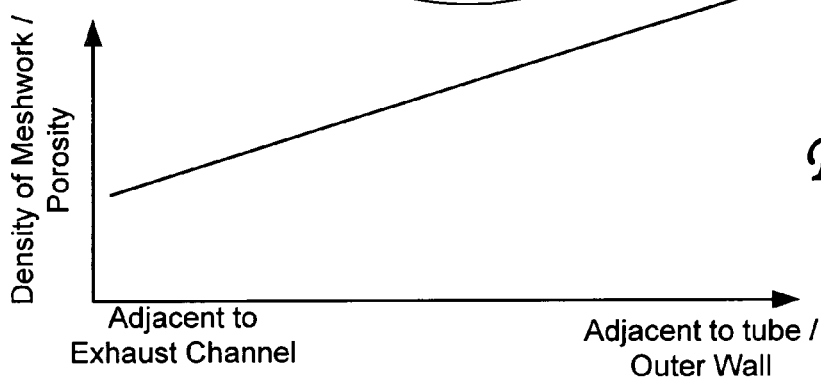
FIG. 9 shows an exemplary meshwork or porosity density distribution from adjacent the exhaust channel to adjacent the tube or outer wall of the present device, according to an embodiment of the present invention.
Figure 10:
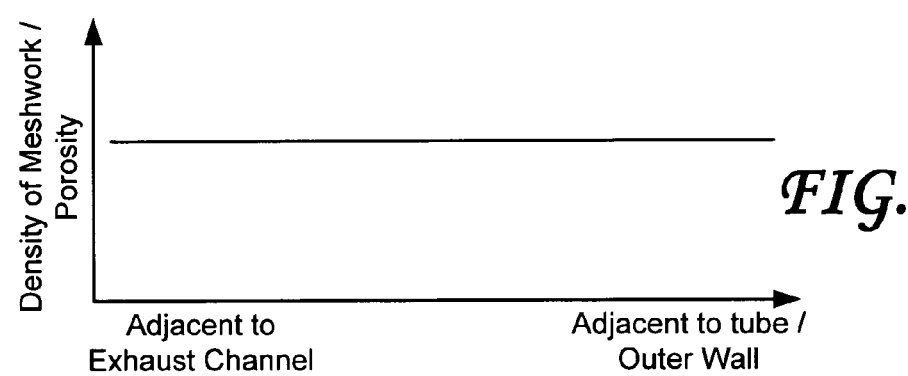
FIG. 10 shows another exemplary meshwork or porosity density distribution from adjacent the exhaust channel to adjacent the tube or outer wall of the present device, according to an embodiment of the present invention.
Figure 11:
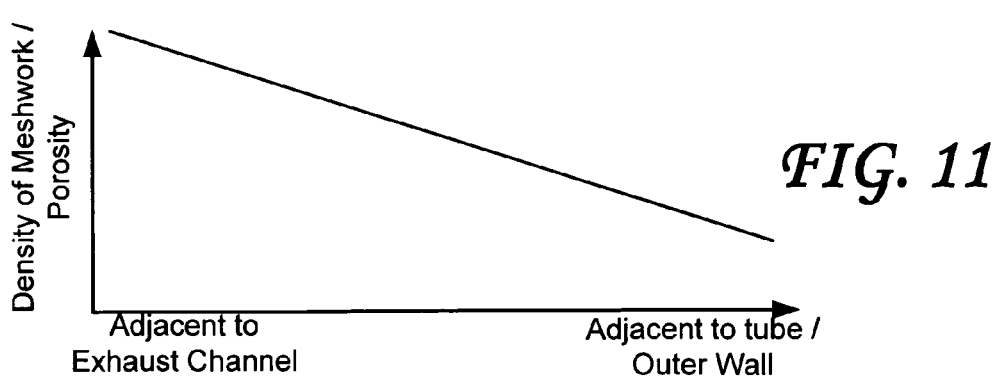
FIG. 11 shows an exemplary meshwork or porosity density distribution from adjacent the exhaust channel to adjacent the tube or outer wall of the present device, according to an embodiment of the present invention.

FIG. 8 is a cross-sectional view of the device of FIG. 4A, taken along cross-sectional lines AA'. FIGS. 9-11 show exemplary meshwork or porosity density distributions from adjacent the exhaust channel 110 to adjacent the tube 106 or outer wall of the present device, according to embodiments of the present invention. Indeed, the liner material 108 may be configured to have a greater density closest to the exhaust channel 110 than closer to the outer wall of the device, as shown in FIG. 9. In this manner, larger-sized particulates 112 may tend to become trapped within the relatively loose meshwork (or more porous) close to the exhaust channel 110 whereas the relatively tighter meshwork (or less porous) may tend to trap smaller sized particulates 112 nearer the outer wall or peripheral region of the device. Alternatively, as shown in FIG. 10, the density distribution of the liner material or the porosity of the liner material 108 may be constant, from adjacent the exhaust channel to adjacent the outer wall of the device. Alternatively still, the density of the meshwork or the density of the porosity of the liner material 108 may be configured to decrease from adjacent the exhaust channel 110 to adjacent the outer wall of the device, as shown in FIG. 11.

The shape, distribution and size of the voids within the liner material in which the particulates 112 become trapped may be adjusted and fine tuned as desired according to the application and according to the manufacturing processes and materials used.

Embodiments of the present invention cannot positively reduce particulate emission from Diesel exhaust to zero. Rather, the embodiments shown and described herein is a cost effective means of providing a substantial reduction in particulate emission, thereby correspondingly reducing the amount of particulates 112 entering the environment. Embodiments of the present invention may be employed in combination with other methods and pollution-reducing devices, and is particularly effective for the worst polluting engines or for achieving an initial reduction in the density of particulates in the gaseous Diesel exhaust.

The present invention has been described in connection with the preferred embodiments, however, it is understood that many alternatives are possible without departing from the scope of the invention. For example, a factory smokestack may be configured according to the an embodiment of the present invention so that polluting exhaust gas constituents (such as vaporized mercury) may be separated from lighter gases condensing at a much higher temperature. The general physical principles on which the embodiments of the present invention are based will allow a wide variety of gases, liquid drops or mist, particles, and other exhaust components to be separated as the exhaust flue design differentially affects them.

The invention claimed is:

1. A pollution reducing device, comprising:
a tube defining an internal lumen having a longitudinal axis, a first free end and a second free end;
a layer of particulate absorbing material disposed within the internal lumen, the particulate absorbing material defining a helically-shaped void that extends from the first free end to the second free end, the layer of particulate absorbing material defining a porosity density and wherein the porosity density is greater closer to the longitudinal axis than it is away from the longitudinal axis.

2. The pollution reducing device of claim 1, further including an exhaust inlet coupled to the first free end and an exhaust outlet coupled to the second free end.

3. The pollution reducing device of claim 1, wherein the layer of particulate absorbing material defines a porosity density and wherein the porosity density is constant from the first free end to the second free end.

4. The pollution reducing device of claim 1, wherein the layer of particulate absorbing material defines a porosity density and wherein the porosity density is different near the first free end than it is near the second free end.

5. The pollution reducing device of claim 4, wherein the porosity density increases from the first free end to the second free end.

6. The pollution reducing device of claim 4, wherein the porosity density decreases from the first free end to the second free end.

7. The pollution reducing device of claim 1, wherein the particulate absorbing material includes a ceramic.

8. The pollution reducing device of claim 7, wherein the particulate absorbing material includes a ceramic foam.

9. The pollution reducing device of claim 1, wherein the particulate absorbing material defines a meshwork.

10. A method of reducing particulate pollution from a source of particulate-containing exhaust, comprising the steps of:
providing a pollution reducing device, the pollution reducing device including a tube defining an internal lumen having a longitudinal axis, a first free end and a second free end, and a layer of particulate absorbing material disposed within the internal lumen, the particulate absorbing material defining a helically-shaped void that extends from the first free end to the second free end, the layer of particulate absorbing material further defining a porosity density and wherein the porosity density is greater closer to the longitudinal axis than it is away from the longitudinal axis;
coupling the pollution reducing device to the source of exhaust, and trapping particulates from the exhaust within the particulate absorbing material.

11. The method of claim 10, wherein the providing step is carried out with the pollution reducing device further comprising an exhaust inlet coupled to the first free end and an exhaust outlet coupled to the second free end.

12. The method of claim 10, wherein the providing step is carried out with the layer of particulate absorbing material defining a porosity density and wherein the porosity density is constant from the first free end to the second free end.

13. The method of claim 10, wherein the providing step is carried out with the layer of particulate absorbing material defining a porosity density and wherein the porosity density is different near the first free end than it is near the second free end.

14. The method of claim 13, wherein the providing step is carried out with the porosity density increasing from the first free end to the second free end.

15. The method of claim 13, wherein the providing step is carried out with the porosity density decreasing from the first free end to the second free end.

16. The method of claim 10, wherein the providing step is carried out with the particulate absorbing material including a ceramic.

17. The method of claim 16, wherein the providing step is carried out with the particulate absorbing material including a ceramic foam.

18. The method of claim 10, wherein the providing step is carried out with the particulate absorbing material defining a meshwork.

* * * * *